US010211616B2

(12) United States Patent
Sauer et al.

(10) Patent No.: US 10,211,616 B2
(45) Date of Patent: Feb. 19, 2019

(54) CABLE/LINE INSERTION

(71) Applicant: EATON PROTECTION SYSTEMS IP GMBH & CO. KG, Schönefeld (DE)

(72) Inventors: Dieter Sauer, Heddesbach (DE); Reiner Naumann, Mannheim (DE)

(73) Assignee: Eaton Protection Systems IP GmbH & Co. KG, Schonefeld (DE)

( * ) Notice: Subject to any disclaimer, the term of this patent is extended or adjusted under 35 U.S.C. 154(b) by 0 days.

(21) Appl. No.: 15/571,939

(22) PCT Filed: May 6, 2016

(86) PCT No.: PCT/EP2016/060149
§ 371 (c)(1),
(2) Date: Nov. 6, 2017

(87) PCT Pub. No.: WO2016/177864
PCT Pub. Date: Nov. 16, 2016

(65) Prior Publication Data
US 2018/0138682 A1 May 17, 2018

(30) Foreign Application Priority Data
May 6, 2015 (DE) .......... 10 2015 208 398

(51) Int. Cl.
*H02G 3/32* (2006.01)
*H02G 3/06* (2006.01)
(Continued)

(52) U.S. Cl.
CPC ............ *H02G 3/32* (2013.01); *F16L 5/027* (2013.01); *F16L 5/06* (2013.01); *H02G 3/0616* (2013.01);
(Continued)

(58) Field of Classification Search
CPC ..................................................... H02G 3/32
See application file for complete search history.

(56) References Cited

U.S. PATENT DOCUMENTS 4,407,042 A * 10/1983 Schramme ............ H02B 1/044
16/2.1
7,422,181 B2 * 9/2008 Sußenbach ............... F16L 3/10
174/664
(Continued)

FOREIGN PATENT DOCUMENTS

DE 3731149 A1 3/1989
EP 2096728 A2 9/2009
EP 2858190 A2 4/2015

Primary Examiner — Hung V Ngo
(74) Attorney, Agent, or Firm — Stinson Leonard Street LLP

(57) ABSTRACT

A cable/line insertion is used to insert and thread at least one line into and through a wall opening into a housing wall. The insertion comprises an insertion sleeve for inserting into the wall opening, a pressing flange which projects substantially radially outwards from same, in places, and a clamping part which in particular can be screwed in the direction of the pressing flange onto the insertion sleeve, and a fastening section of the insertion sleeve, which is arranged opposite the clamping part. The fastening section comprises a contact surface which projects at least in places substantially radially outwards, which contact surface can be engaged from behind by a plug part for pressing the pressing flange to an opening edge of the wall opening.

15 Claims, 3 Drawing Sheets

(51) Int. Cl.
*H02G 3/08* (2006.01)
*F16L 5/06* (2006.01)
*F16L 5/02* (2006.01)

(52) U.S. Cl.
CPC ........... *H02G 3/0625* (2013.01); *H02G 3/083* (2013.01); *H02G 3/088* (2013.01)

(56) References Cited

U.S. PATENT DOCUMENTS

2011/0155457 A1   6/2011  Horinaka
2014/0318852 A1* 10/2014 Adachi ............... H01R 13/648
                                                 174/350

* cited by examiner

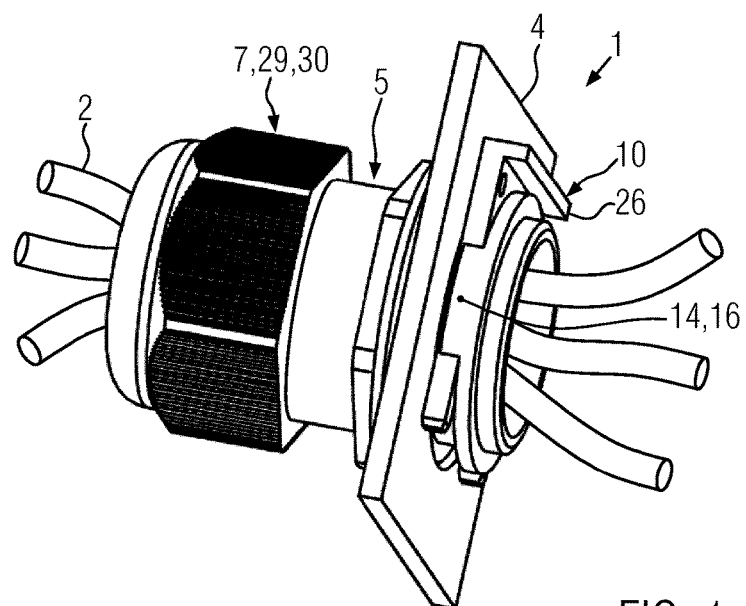
FIG. 1
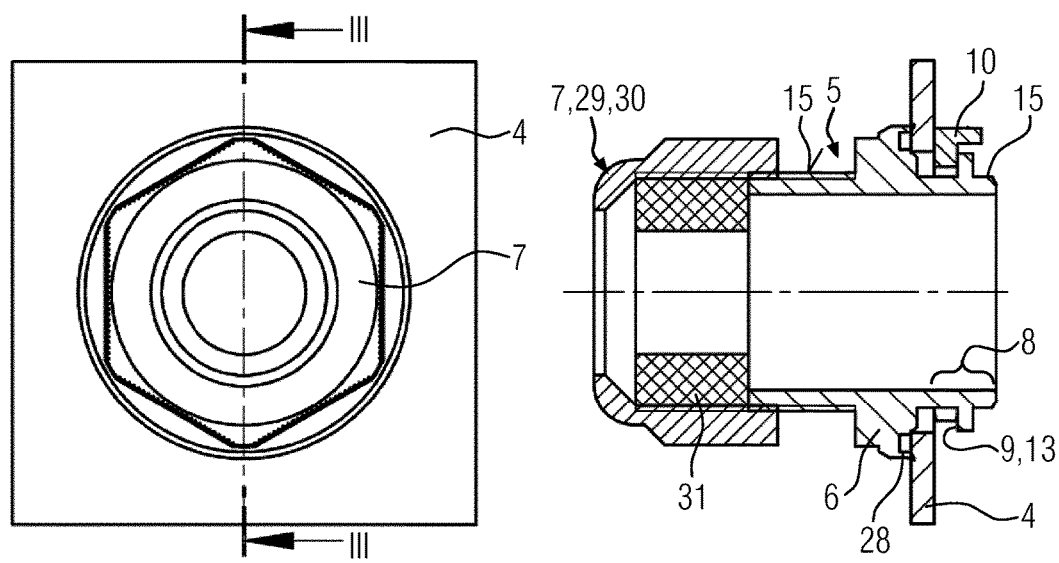
FIG. 2
FIG. 3

CABLE/LINE INSERTION

FIELD OF THE DISCLOSURE

The present invention refers to a cable/line insertion, also called a cable/line duct, which is used for inserting and threading at least one line or cable into and through a wall opening into a housing wall.

BACKGROUND OF THE DISCLOSURE

A cable/line insertion is an element to be applied separately and is mounted, according to the respective requirements, in a wall opening of the housing wall, which is already present or which has already been provided. The housing wall is a wall, for example, of a terminal box, a socket distribution, a plug device, a lamp housing, a control apparatus or another electrical operating device. Depending on the requirements, the cable/line insertions may also be provided with an explosion protection.

In a cable/line insertion known in the art, the cable/line insertion is provided with an insertion sleeve to be inserted into the wall opening, a pressing flange which projects substantially radially outwards from same, in places, a clamping part which in particular can be screwed in the direction of the pressing flange onto the insertion sleeve, and a fastening section of the insertion sleeve, which is arranged opposite the clamping part. The fastening section allows the fastening to the corresponding housing wall and has in the known insertion a threading, which may be screwed on a corresponding threading within the wall opening. In this way, the cable/line insertion is fixed in the wall opening of the housing wall. The cables or lines are then threaded through the insertion sleeve and fastened by means of the clamping part in the insertion sleeve or relative to the insertion sleeve, in order to also form a corresponding tension relief, for example.

The already known cable/line insertion has to be fastened in the fastening section or in the wall opening by performing a number of rotations through the corresponding threading. This normally requires a lot of time and a precise positioning and rotation of the insertion sleeve. In particular in case of tight spaces, such an insertion of the cable/line insertion may be difficult to perform.

SUMMARY

The object of the disclosure is thus to improve the cable/line insertion of the state of the art in such a way that it may be used even in tight spaces and which may be rapidly fastened with simple means inside the wall opening.

In one aspect, the invention is characterized in particular by the fact that the fastening section has a contact surface which projects at least in places substantially radially outwards, which contact surface can be engaged from behind by a plug part for pressing the pressing flange to an opening edge of the wall opening. This means that the corresponding contact surface is directed towards the pressing flange and is positioned on the opposite side of the housing wall with respect to the pressing flange. After a corresponding insertion of the insertion sleeve into the wall opening, the plug part is inserted between housing wall and contact surface and this causes both a fixing of the insertion sleeve with respect to the wall opening and a pressing of the pressing flange against the opening edge or the housing wall. This means that no rotation of the insertion sleeve relative to the housing wall is required, but only a substantially straight movement for inserting and partial threading of the insertion sleeve in or through the wall opening. Afterwards the fastening by means of the plug part takes place. This may be easily accomplished by the operator without any additional tool.

In order to avoid an optional special orientation of the insertion sleeve for inserting the plug part, the contact surface may be provided as a contact flange, which is completely surrounding in the circumferential direction of the fastening section. This also protrudes substantially radially outwards from the fastening section in a way similar to the contact surface.

In order to improve the insertion and guidance of the plug part it may be advantageous if the contact surface has at least a retaining wall section directed towards the pressing flange, which section extends at at distance from the outer side of the fastening section. This means that the corresponding plug part is threaded between the outer side of the fastening section and this retaining wall section, and will fix the insertion sleeve by simultaneously pressing on the pressing flange by engaging behind and contacting with the contact surface.

In order to improve the insertion of the plug part on both sides relative to the fastening section, it may be advantageous if two retaining wall sections protrude substantially in diametrically opposite positions from the contact surface.

The guiding of the plug part may be further improved if optionally the fastening section has, on its outer side, opposite the respective retaining wall section, substantially planar guiding surfaces. The plug part is guided along these planar guiding surfaces, without it being possibly spread outwards due to a corresponding curvature of the fastening section in this area.

In order to improve the conduction of the plug part when inserting, it may be advantageous if the length of the guiding surface is larger than the length of the associated retaining wall section.

A simple example of a plug part may be considered in that it is essentially U-shaped, wherein each leg of the U may be inserted between the guiding surface and the retaining wall section. Due to the planar guiding surface, wherein the opposite guiding surfaces may be parallel to each other, the legs of the U may also be extending substantially along a straight line and may thus be easily inserted between the guiding surface and the retaining wall section.

When inserting the plug part the pressing of the pressing flange has to occur in a simple way, wherein for example this is achieved, if the U leg and/or each interstice between the contact surface and the contact flange have a wedge shape. Due to this wedged shape, when applying the plug part in the fastening section, an increasing pressing force is obtained in the area of the pressing flange by contacting the corresponding wedge areas and by relative motion of these wedge regions. It is also possible that only the legs of the U or even only the corresponding interstice is provided with this wedged shape. The respective other part may also be provided with straight and flat surfaces for interacting with the wedge-shaped surfaces.

If for example only the U legs are wedge shaped, this may be accomplished by the fact that the U legs of the plug part spread wedge-like at least in portions from the respective free end of the U leg towards the U web in the longitudinal direction of the insertion sleeve. This means that the corresponding thickness of the U leg increases from the free end towards the U web.

In order to define a maximum insertion position of the plug part, the U web may have an abutment bar, which in the inserted state, is directed away from the abutment flange. This bar may contact from outside the contact flange in the position of maximum insertion, for example.

In many cases, corresponding cable/line insertions are also grounded. In order to allow, according to one aspect of the invention, in a simple way, a corresponding connection with the ground, the U web or the abutment bar may be provided with a grounding contact terminal. This means that no additional measures or connections are required, but a corresponding grounding is directly attached to the plug part and the corresponding grounding contact terminal.

In order to improve the sealing of the wall opening and also in view of a possible explosion protection it may also be advantageous if the pressing flange has at least one open sealing groove, which is open towards the opening edge. Therein an O-ring may be inserted, for example, as a sealing means.

In order to fasten the clamping part in an easy way to the insertion sleeve, this may be provided by a nut, which in particular may be screwed onto the insertion sleeve.

In an advantageous example, such a nut may be a cap nut and a line sealing sleeve, which is in particular deformable, may be in particular be positioned therein. This line sealing sleeve may be provided, alternatively or additionally to clamp blades, positioned like an iris, wherein these clamp blades are formed at the end of the sleeve, onto which the corresponding nut or cap nut may be screwed. The line sealing sleeve is in particular deformed inwards in the radial direction, in order to fix the cables or lines conducted through the line sealing sleeve, and to form a tensile strength relief.

In order to deform the line sealing sleeve by screwing the cap nut, it is envisaged that the line sealing sleeve, when the cap nut is screwed, contacts, with its inner end a front side of the insertion sleeve. A corresponding outer end of the line sealing sleeve contacts, from the inside, the cap nut, so that in case of a corresponding further screwing of the cap nut, the deformation of the line sealing sleeve takes place.

In order to hold, if possible, the insertion sleeve in its position by means of a tool or similar, in an easy way, and to provide a rotation lock, the insertion sleeve may have a screw flange which is formed radially and in particular integrally with the pressing flange. A wrench may then be applied, for example, from outside, on this screw flange.

It is also possible that the pressing flange and the screw flange are formed at a distance from each other on the corresponding outer side of the insertion sleeve.

In order to be readily supported with respect to the housing wall, the plug part may be provided on its side facing the pressing flange with a contact surface for contacting the housing wall. This means that when applying the plug part, this contact surface moves along the housing wall and is supported by it. Due do the corresponding wedged shape then by further insertion of the plug part a corresponding tensile force is exerted on the insertion sleeve for further pressing the pressing flange on the opening edge or the housing wall.

Various safety measures may be envisaged, in order to keep the plug part in its corresponding inserted position. Such safety measures are for example friction increasing profiles, coatings or similar, which are directly applied on the surfaces in direct contact of housing wall, plug part and optionally the contact surface. Such a safety measure may be considered for example the fact that the plug part in particular in its U web, has at least one insertion bore for inserting a safety pin, which insertion bore is aligned with an insertion bore in the housing wall or opening edge, when the plug part is inserted. This means that in this aligned position of the safety insertion bore and the insertion bore, the safety pin is inserted and holds the plug part in its position.

It was already mentioned that the inventive cable/line insertion may be used in particular also in areas with an explosion danger. To this end, the corresponding cable/line insertion is an Ex cable/line insertion, in particular an Ex-d or Ex-e cable/line insertion.

Moreover, according to one embodiment of the invention, it may be envisaged that the plug part is not only used for fastening an insertion sleeve but also for two or more insertion sleeves and thus correspondingly for two or more cable/line insertions. This means that the one plug part may be introduced between the contact surface and the housing wall with this plurality of cable/line insertions, by using its U-legs. This means for example that with two adjacent cable/line insertions, the plug part has four corresponding legs, which are positioned, for example in pairs at a corresponding distance in order to be inserted on the fastening section of the respective cable/line insertion. However, in this case, the distance of the cable/line insertion is determined by the arrangement of the corresponding legs.

In certain cases, it is necessary to replace the cable/line insertion, since it is damaged for example. In order to prevent that for example, the lines have to be separated from the corresponding electronic or electric device, in order to position a new cable/line insertion, the clamp part, the insertion sleeve, and the line sealing sleeve may be assembled with at least two single elements, which are essentially divided in the axial direction of the cable/line insertion. This means that the corresponding individual elements form half-shells, which along corresponding division edges for their position precise assembling, have guiding/positioning means. These are used both for positioning and assembling the individual elements. Thus, it is possible, without loosening corresponding cables or lines, replace a cable/line insertion with a new, in that the corresponding individual elements are applied on cable or line and connected to each other.

In view of the plug part, such a division in two parts is normally unnecessary, since it is already substantially provided with a U-shape.

In order to use the cable/line insertion also for explosion-risk areas, the guiding and/or positioning means are formed by guiding and/or positioning means which interlock with each other, and which have in particular locking hooks and/or pins and/or tabs or similar, which may engage corresponding counter-elements formed by interlocking and/or insertion openings. The release of these interlocking guiding and/or positioning means is only possible by using a corresponding special tool.

Moreover, at least in the region of the insertion sleeve a sealing structure may be arranged, which seals a corresponding line additionally to the line sealing sleeve with respect to an outer atmosphere. This sealing structure extends in particular along the corresponding separation edges of the individual elements of the insertion sleeve.

In this way, a further advantage is achieved by at least one aspect of the present invention in that a cable/line insertion is obtained for use in explosion endangered areas, which provides a corresponding protection grade and also explosion protection conditions such as Ex-l or Ex-e and also facilitates the replacement of a cable/line insertion even without disconnecting the corresponding electric or electronic device.

BRIEF DESCRIPTION OF THE DRAWINGS

FIG. 1 shows a perspective side view of a first example of an inventive cable/line insertion;

FIG. 2 shows a front view of the cable/line insertion of FIG. 1,

FIG. 3 shows a longitudinal section of the cable/line insertion of FIG. 1 along the line III-III of FIG. 2.

DETAILED DESCRIPTION

Figure 4:
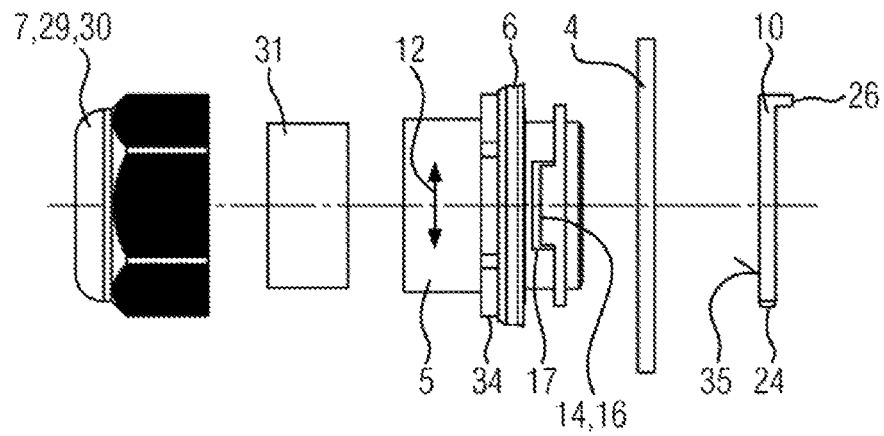
FIG. 4 shows an expanded representation in a side view of the cable/line insertion of FIG. 1.

FIG. 1 shows a perspective side view of a first exemplary embodiment of an inventive cable/line insertion 1. This is provided with a number of elements, such as a clamping part 7 formed by a nut 29 and in particular a cap nut 30 as well as an insertion sleeve 5. On the insertion sleeve, on one end the cap nut 30 may be screwed. Between this and the insertion sleeve 5 a deformable line sealing sleeve 31 is positioned. By corresponding screwing of the cap nut 30 on the insertion sleeve 5, it is compressed and elastically deformed, in particular in a radial direction inwards. Thus, corresponding cables or lines 2 are clamped and fixed, wherein at the same time a tensile relief is provided. At an end of the insertion sleeve 5 which is facing the clamping part 7 a fastening section 8, see also FIGS. 3 and 4, is formed. It is inserted through a corresponding wall opening 3 of a housing wall 4 and fastened inside the housing by means of a plug part 10. Due to the fixing with the plug part 10 a pressuring of a pressing flange 6 against the housing wall 4 or the opening edge 11 is also obtained. This protrudes radially outwards from the insertion sleeve 5, see FIGS. 3 and 4, and extends in the circumferential direction 12 from the insertion sleeve 5 or the fastening section 8. Directly besides the pressing flange and integrally with it a screw flange 34 is also formed.

The pressing flange 6 is provided on its side facing the housing wall 4 with an open sealing groove 28, see FIG. 3, in which for example an O-ring may be inserted as a sealing means (not shown). In FIGS. 1 and 3 the plug part 10 is already inserted on the fastening section 8, wherein it is positioned between a corresponding inner side of the housing wall 4 and a contact surface 9 as part of a contact flange 13. The contact surface 9 or the contact flange 13 protrude radially outwards from the fastening section 8 and is positioned at a distance from the inner side of the housing wall 4, when the insertion sleeve 5 is inserted in the wall opening 3. In the corresponding interstice between the contact surface 9 and the housing wall 4 the plug part 10 may be inserted.

At least in two diametrically opposed positions of the contact flange 13, it is provided with retaining wall sections 14 or 16 directed towards the pressing flange 6. In FIG. 1, the retaining wall section 14 is visible, wherein the further retaining wall section 16 is diametrically opposed to this relative to the fastening section 8. The corresponding retaining wall sections 14 are positioned at a distance from the outer side 15, see also FIG. 3, the insertion sleeve 5 or the corresponding fastening section 8. Due to this spacing an interstice 23 is formed, see also FIG. 5. In this interstice, the plug part 10 is positioned, wherein it has in particular a U shape, see also FIG. 5, with two U-legs 20, 21 and a U-web 22 connecting the same.

According to FIGS. 1 and 3, the U-web 22 is at least partially inserted in the interstice between the contact surface 9 and the housing wall 4.

In FIG. 2 a front view of the cable/line insertion 1 is shown from the side of the clamping part 7 or cap nut 30. In particular the hexagonal cross-sectional shape of the cap nut 30 may be seen.

FIG. 3 corresponds to a section along line III-III in FIG. 2. Between the cap nut 30 and the insertion sleeve 5 the line sealing sleeve 31 is provided, which in the state shown is still not radially and inwardly deformed for clamping the corresponding lines or cables 2 and contacts with its inner end 31 a front side 33 of the insertion sleeve. By further screwing the cap nut 30 on a corresponding outer threading of the insertion sleeve 5, a deformation of this inner end 31 takes place with fixing of the line or cable and provision of a tensile relief.

The insertion sleeve 5 has, approximately centrally the pressing flange 6 with screwing flange 34, wherein on the opposite side with respect to the cap nut 30 of this, the corresponding fastening section 8 is formed. FIG. 3 does not show that the pressing flange 6 has a step section which is partially positioned in the wall opening 3, which for example facilitates the alignment of the insertion sleeve 5 relative to the wall opening 3. On the opposite side of the housing wall 4 the plug part 10 contacts with corresponding contact surface 35, see also FIGS. 4 and 6, which is inserted between the housing wall 4 and the contact surface 9 or contact flange 13.

Figure 5:
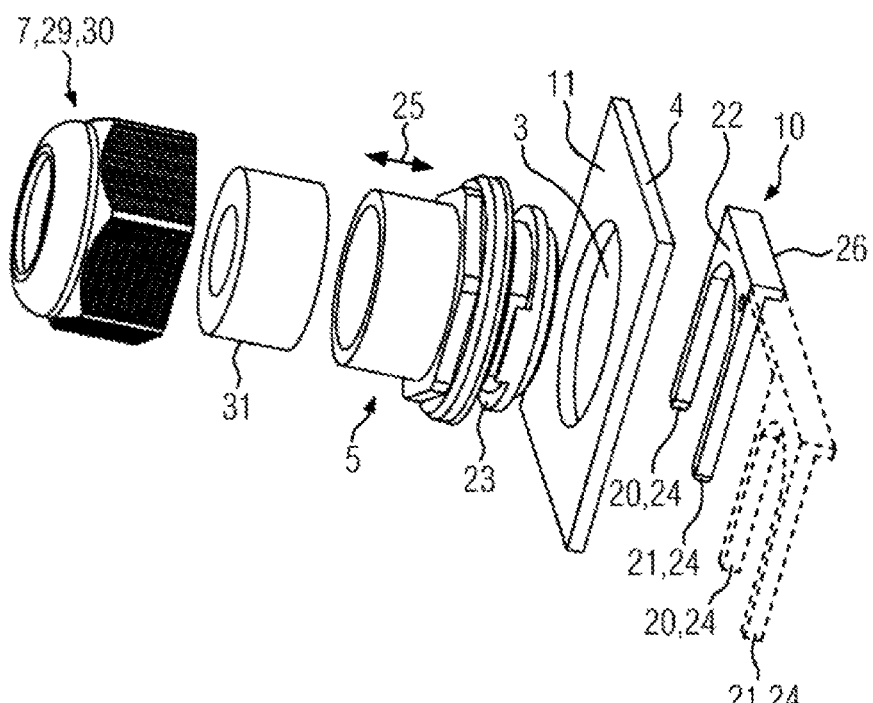
FIG. 5 shows a perspective and expanded view of the cable/line insertion of FIG. 4 with an alternative plug part.

In order to facilitate a pressing of the pressing flange 6 in an easy way, when a corresponding insertion of the plug part 10 in the interstice between the housing wall 4 and the contact flange 13 is performed, the plug part 10 has a wedged shape, so that its thickness increases from the free end 24 of the corresponding U-legs 21, 22, see also FIG. 5, towards the U-web 22.

Due to corresponding fitting accuracy, both of the wall opening 3 and the cable/line insertion 1 the thickness increases as well as the wedge shape may be very small.

FIG. 4 shows an expanded representation of the first example of the cable/line insertion of the preceding figures. Reference is additionally made to the previous description.

In FIG. 4 it may in particular be seen, that in the fastening section 8 the retaining wall sections 14 or 16 extend, diametrically opposite from the contact flange 13 towards the pressing flange 6, i.e. in the longitudinal direction 25 of the fastening section 8. The retaining wall sections 14, 16 end at a distance from the pressing flange 6 and are also separated from the outer side 15 of the fastening section 8. The corresponding outer side 15 has guiding surfaces 17, which are opposite the retaining wall sections 14, 16, which are substantially planar and parallel to each other, on both sides and diametrically opposed with respect to the insertion sleeve 5 or to the fastening section 8. A respective guiding surface 17 is associated to a corresponding retaining wall section 14 or 16. There between, the interstice 23 is formed, see also FIG. 5, in which the U-legs 20, 21 of plug part 10 may be inserted. The guiding surfaces 17 in the example shown have a length 18, which is larger than a corresponding length 19 of the associated retaining wall section 14 or 16.

The insertion of the plug part 10 only takes place when the free ends 24 of the U-legs 20, 21 are in this interstice 23 and then a threading of the U-legs through this interstice takes place, until, as shown in FIG. 1, the free ends 24 are extracted from the interstice 23 and lie free. At the same time during this insertion of the plug part 10, a contact between the contact surface 35 and the inner side of the housing wall 4 takes place as well as due to the corresponding wedged shape of the U-legs 20, 21 an increased pressing of the pressing flange 6 from the opposed side of the housing wall 4.

FIG. 5 shows a modification of the plug part 10 in dashed lines. In it, for example, four U-legs 20, 21 are positioned in respective pairs. Each pair of the U-legs 20, 21 is associated to a separate cable/line insertion 1, so that in this alternative of the plug part 10, simultaneously two insertion sleeves 5 which are separated and adjacent to each other, of the cable/line insertion 1 may be fastened.

Further examples of plug parts 10 to be applied for two or more insertion sleeves 5 are possible, such as three pairs of U-legs or a corresponding extension of the U-legs for fixing two cable/line insertions positioned together in the housing wall.

Figure 6:
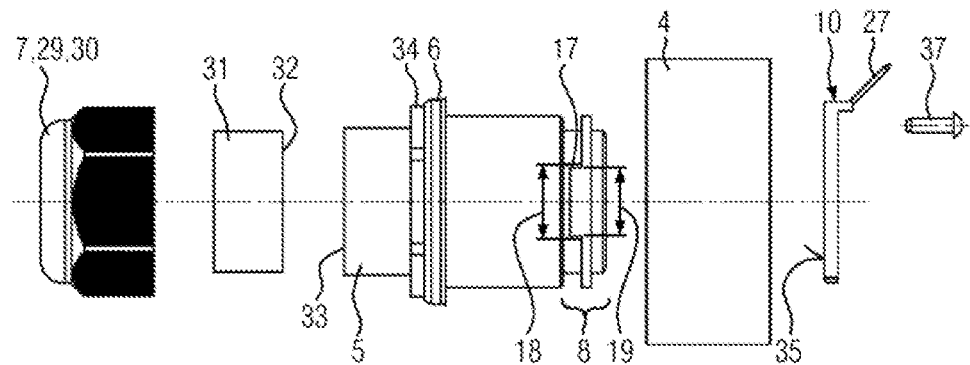
FIG. 6 shows a side view of a second example of an inventive cable/line insertion similar to FIG. 4
Figure 7:
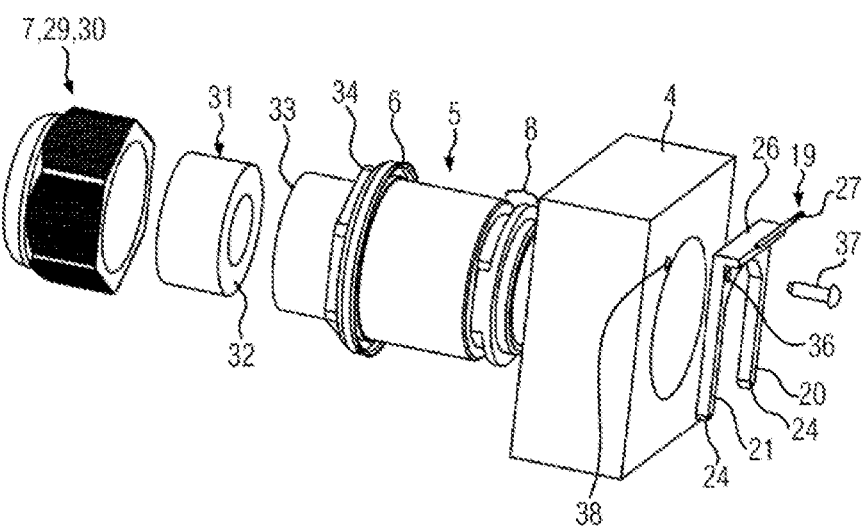
FIG. 7 shows a perspective and expanded view of the cable/line insertion of FIG. 6.

FIGS. 6 and 7 show a further example of a cable/line insertion 1, which is in particular an Ex-d-cable/line insertion, while the cable/line insertion 1 of previous figures is of protection grade Ex-e.

The example of FIGS. 6 and 7 differs from the previous example essentially because of the longer length of the section disposed in the wall opening 3 of the insertion sleeve 5 and a correspondingly larger thickness of the housing wall 4. The rest of the structure of the example of FIGS. 6 and 7 corresponds to that of FIGS. 1 to 5.

Reference is also made to the corresponding description in connection with figures.

In FIGS. 6 and 7, it is also shown that the length 18 of the guiding surface 17 is larger than the length 19 of the associated retaining wall section 16. Moreover, the plug part 10 has in the region of the U-web 22 an abutment bar 26 protruding in the longitudinal direction 25 of the insertion sleeve 5. This bar, see also FIG. 3, limits the insertion of the plug part 10 in the corresponding interstice 23. The plug part 10 may be inserted at most to contact of this abutment bar 26 with the outer circumference of the contact flange 13.

In the region of the abutment bar 26, in FIGS. 6 and 7, a ground contact terminal 27 is also shown, which is directly used for grounding the cable/line insertion 1. Other configurations of the grounding contact terminal 27 may also be possible, such as an extension of the U-legs 20 or 21 or of another point of the abutment bar 26 or U-web 22. In a connection region between the U-leg 21 and the U-web 22 an insertion bore 36 is positioned. This is aligned, when the plug part 10 is inserted, with a corresponding insertion bore 38 in the housing wall 4, or in the opening edge 11. Through both the plug bore 36 and the insertion bore 38 in this position, a safety pin 37 may be inserted. This fixes the plug part 10 in the inserted position, in which the pressing flange 6 presses with a sufficient pressure on the housing wall 4.

In FIG. 7 a division plane 39 is also shown, which extends substantially in the axial direction of the cable/line insertion 1. This is used for characterizing the separation of the various parts in individual elements, see in particular clamp part 7, line sealing sleeve 31 and insertion sleeve 5. In an example of the invention, these are respectively separated in two elements, which form essentially a half shell, so that assembling both half shells elements the corresponding complete parts are formed. Thus, it is possible to replace a cable/line insertion with another, even with a line connected to corresponding electric or electronic devices within the housing. To this end, from opposite sides of the corresponding line the individual elements are applied and connected to each other by the corresponding guiding and/or positioning means. These guiding and/or positioning means are also used for a precise alignment, locking and connection of single elements. The release of the corresponding interlocking is only possible by means of a special tool, so that this cable/line insertion is also a corresponding protection and may be used in explosion endangered regions. The guiding and/or positioning means are interlocking means and have locking hooks and/or locking tabs or similar, which may engage with corresponding counter-elements formed by locking and/or insertion openings. These locking or insertion elements are positioned along corresponding separation edges of the individual elements and facilitate the positioning, aligning and connection of single elements. Moreover, along the separation edges at least of the single elements of the insertion sleeve 5 a sealing structure may be positioned, which ensures a sealing of the corresponding line or cable inside the insertion sleeve in addition to the line sealing sleeve with respect to the external atmosphere.

Regarding plug part 10, it is also to be noted that it may be provided with corresponding grounding. Examples of a corresponding grounding are c, w or w/o. In particular in the w/o version, the plug part may also be formed of plastics. A corresponding metal layer positioned at least locally on the plug part is sufficient in this context, in order to provide the grounding.

According to one aspect of the invention, a cable/line insertion 1 is provided, which may be easily positioned in the corresponding wall opening 3 with a corresponding insertion sleeve 5, wherein the plug part 10 may be applied rapidly and securely without further auxiliary means. Due to this application of the plug part 10 both a securing of the insertion sleeve 5 within the wall opening 3 and a sufficient pressing of the pressing flange 6 from outside against the housing wall 4 are ensured.

As already indicated, the cable/line insertion according to one aspect of the invention may also be configured with a corresponding explosion protection, such as Ex-d or Ex-e.

The invention claimed is:

1. A cable/line insertion for inserting and threading at least one line into and through a wall opening into a housing wall, comprising:
    an insertion sleeve for inserting into the wall opening,
    a pressing flange which projects substantially radially outwards from the insertion sleeve, and
    a clamping part configured to be screwed in the direction of the pressing flange onto the insertion sleeve,
    wherein the insertion sleeve includes a fastening section arranged opposite the clamping part,
    wherein the fastening section comprises a contact surface which projects radially outwards, wherein the contact surface is configured to be engaged from behind by a plug part for pressing the pressing flange onto an opening edge of the wall opening,
    wherein the contact surface has at least one retaining wall section extending from the contact surface towards the pressing flange, the at least one retaining wall section partially covering the contact surface and being spaced apart at a distance from an outer side of the fastening section.

2. The cable/line insertion of claim 1, wherein the contact surface is configured as an entirely surrounding contact flange extending in the circumferential direction of the fastening section.

3. The cable/line insertion of claim 1, wherein the at least one retaining wall section comprises two retaining wall sections projecting substantially in diametrically opposite positions from the contact surface.

4. The cable/line insertion of claim 1, wherein the fastening section has on its outer side opposite the respective retaining wall section substantially planar guiding surfaces, wherein the length of the guiding surface is larger than the length of the corresponding retaining wall section.

5. The cable/line insertion of any of claim 4, further comprising the plug part, wherein the plug part has substantially a U-shape including opposing plug part legs, wherein each plug part leg is configured to be inserted between the guiding surface and a corresponding retaining wall section.

6. The cable/line insertion of claim 4, wherein the plug part includes an abutment bar above the plug part legs, and a ground contact terminal.

7. The cable/line insertion of claim 1, wherein the pressing flange has at least one sealing groove opening in the direction of the opening edge.

8. The cable/line insertion of claim 1, wherein the clamping part is formed by a cap nut configured to be screwed on the insertion sleeve.

9. The cable/line insertion of claim 8, further comprising a line sealing sleeve configured to contact the insertion sleeve when the cap nut is screwed on the insertion sleeve.

10. The cable/line insertion of claim 1, wherein the insertion sleeve has a radially outwardly projecting screw flange integral with the pressing flange.

11. The cable/line insertion of claim 1, further comprising the plug part, wherein the plug part has a contact surface for contacting the housing wall on its side directed towards the pressing flange.

12. The cable/line insertion of claim 11, wherein the plug part has at least one insertion bore for inserting a safety pin therein.

13. The cable/line insertion of claim 11, wherein the plug part may be used for two or more cable/line insertions and may be inserted between the contact surface and the housing wall.

14. The cable/line insertion of claim 1, wherein the cable/line insertion is of the Ex type.

15. The cable/line insertion of claim 1, wherein the contact surface, the at least one retaining wall section, and the outer side of the fastening section define an interstice configured to receive a portion of the plug part.

* * * * *